United States Patent
Kawakami et al.

(10) Patent No.: US 9,075,169 B2
(45) Date of Patent: Jul. 7, 2015

(54) DISPLAY DEVICE WITH A LIGHT EMISSION PART DISPOSED AROUND A DISPLAY PART

(71) Applicant: PANASONIC CORPORATION, Osaka (JP)

(72) Inventors: Keizo Kawakami, Hyogo (JP); Ken Miura, Osaka (JP); Suguru Nakao, Hyogo (JP); Ichiro Okuda, Osaka (JP); Shuji Yamashita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 13/971,432

(22) Filed: Aug. 20, 2013

(65) Prior Publication Data
US 2014/0063851 A1 Mar. 6, 2014

(30) Foreign Application Priority Data

Aug. 31, 2012 (JP) .................................. 2012-191037
Jul. 18, 2013 (JP) .................................. 2013-149264

(51) Int. Cl.
*F21V 7/04* (2006.01)
*F21V 8/00* (2006.01)

(52) U.S. Cl.
CPC ............ *G02B 6/0001* (2013.01); *G02B 6/0021* (2013.01); *G02B 6/0046* (2013.01); *G02B 6/0088* (2013.01)

(58) Field of Classification Search
CPC ........................................................ G02B 6/0001
USPC ........................................................... 362/613
See application file for complete search history.

(56) References Cited

U.S. PATENT DOCUMENTS

| 2009/0219305 | A1  | 9/2009 | Diederiks et al. |
| 2011/0018849 | A1* | 1/2011 | Lowe et al. .................... 345/205 |
| 2011/0051019 | A1* | 3/2011 | Hardacker et al. ............ 348/739 |

FOREIGN PATENT DOCUMENTS

| JP | 2007-525800 A | 9/2007 |
| WO | WO-2005/069640 A1 | 7/2005 |

* cited by examiner

Primary Examiner — Anh Mai
Assistant Examiner — Hana Featherly
(74) Attorney, Agent, or Firm — McDermott Will & Emery LLP (57) ABSTRACT

A brightness distribution of light emitted from one specific light source and outputted from the light outputting part of a light-guide part has a characteristic of having a mountain-shaped distribution increasing from a position of the specific light source, then reaching a maximum value, and then decreasing with distance from a specific light source, and a light source adjacent to the specific light source is disposed at a position where a brightness distribution decreases from the maximum value of the brightness distribution.

6 Claims, 12 Drawing Sheets

DISPLAY DEVICE WITH A LIGHT EMISSION PART DISPOSED AROUND A DISPLAY PART

RELATED APPLICATIONS

This application claims the benefit of Japanese Application No. 2012-191037, filed on Aug. 31, 2012 and Japanese Application No. 2013-149264, filed on Jul. 18, 2013, the disclosures of which Applications are incorporated by reference herein.

BACKGROUND OF THE INVENTION

1. Field of the Invention

The present invention relates to a display device having a light-emission part around a periphery of a display part like a portable display such as a thin display, smartphone, or tablet.

2. Description of the Related Art

Display devices of liquid crystal televisions and plasma televisions have been spread as devices which provide information programs such as news and entertainment programs such as movies, or music. According to the above display device, a screen size becomes large, and an image quality and a sound quality are improved, so that images and sound which are as powerful as in a movie theater can be experienced at home.

According to this kind of display device, it has a simple plate shape, and in order to enhance a commercial value in view of design, some decorations are added to a case which covers the periphery of the display part. According to Japanese Translation of PCT Publication No. 2007-525800, it is disclosed that a dramatic impact which is realized by stage lighting in a theater can be similarly experienced by adding surrounding lighting to a television.

SUMMARY OF THE INVENTION

A display device according to the present technique includes a display part for displaying an image, a case for housing the display part, and a light-emission part having a light outputting part exposed at a surface of the case. The light-emission part includes a plurality of light sources, and a light-guide part for guiding light emitted from each of the light sources and outputting the light from the light outputting part. The light-guide part includes a plurality of light inputting parts having the light sources, respectively, for receiving the light from the light sources, a light guiding part for reflecting and guiding the light from each of the light inputting parts in an arrangement direction of the light sources, and the light outputting part for outputting the light guided by the light guiding part. In addition, a brightness distribution of light emitted from one specific light source and outputted from the light outputting part of the light-guide part has a characteristic of having a mountain-shaped distribution increasing from a position of the specific light source, then reaching a maximum value, and then decreasing with distance from the specific light source, and the light source adjacent to the specific light source is disposed at a position where the brightness distribution decreases from the maximum value of the brightness distribution.

DETAILED DESCRIPTION OF THE PREFERRED EMBODIMENT

Hereinafter, a display device according to one exemplary embodiment of the present technique will be described with reference to the drawings. However, an unnecessarily detailed description is occasionally omitted. For example, a detailed description of a well-known matter and a duplicative description for the same configuration are occasionally omitted. This is to prevent a following description from becoming redundant unnecessarily and to make those skilled in the art understand easily.

In addition, the inventors provide accompanying drawings and the following description to make those skilled in the art fully understand the present technique, but it is not intended that the subject of claims is limited by those.

Figure 1:
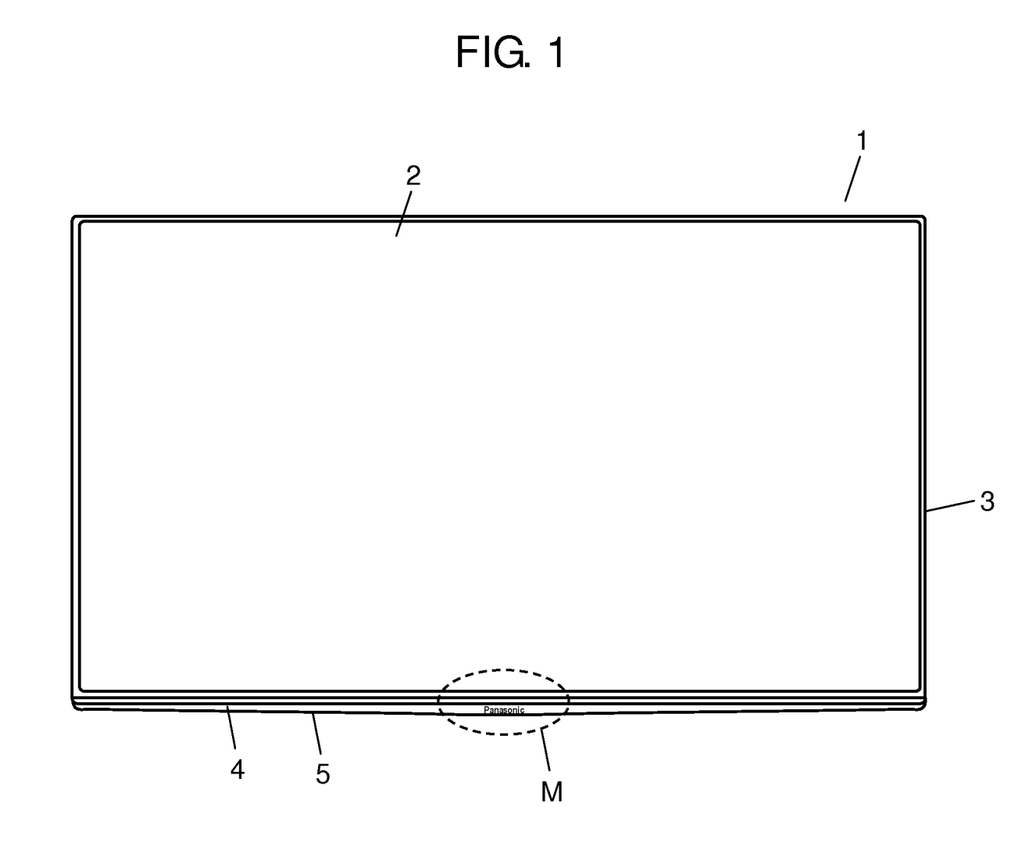
FIG. 1 is a plan view of a display device viewed from a front surface side according to one exemplary embodiment of the present technique.

FIG. 1 is a plan view of a display device viewed from its front surface side according to one exemplary embodiment of the present technique. As shown in FIG. 1, the display device is configured in such a manner that a display panel (not shown) of a plate-shaped liquid crystal display or organic EL display is housed in case 1, and display part 2 of the display panel is provided on the front surface side of the display device.

In addition, case 1 includes metal or resin frame-shaped frame member 3 disposed around a peripheral part of display part 2 on a front surface side of the display panel, and a metal or resin back cabinet (not shown) disposed so as to cover a back surface side of the display panel. Linear light outputting part 5 which serves as a part of light-emission part 4 is exposed at one lower side of a surface of frame member 3 of case 1. In addition, in FIG. 1, light outputting part 5 of light-emission part 4 is only exposed at the one lower side of the surface of case 1, but light-emission part 4 may be disposed so as to be exposed at a whole circumference of the surface of case 1. In addition, light-emission part 4 may be disposed so as to be exposed at two vertical sides or horizontal sides of case 1.

In addition, although they are not shown, the display device includes an antenna terminal for inputting terrestrial digital broadcasting and satellite broadcasting, a tuner for selecting a broadcasting signal received by the antenna terminal, an audio signal from the broadcasting signal received by the tuner, a demultiplexer for separating and extracting a video signal, and a decoder for decoding each of the extracted video signal and audio signal. The video signal decoded by the decoder goes through a liquid crystal panel drive circuit for driving the display panel such as a liquid crystal panel and is displayed on display part 2. The audio signal decoded by the decoder is outputted from a speaker. A main signal processing circuit substrate and a power supply circuit substrate for processing the above processes are disposed on a back surface side of display part 2. A LAN terminal for making external wire communication, and an HDMI terminal for making domestic communication with another device are also provided on a back surface side of the display device.

Figure 2:
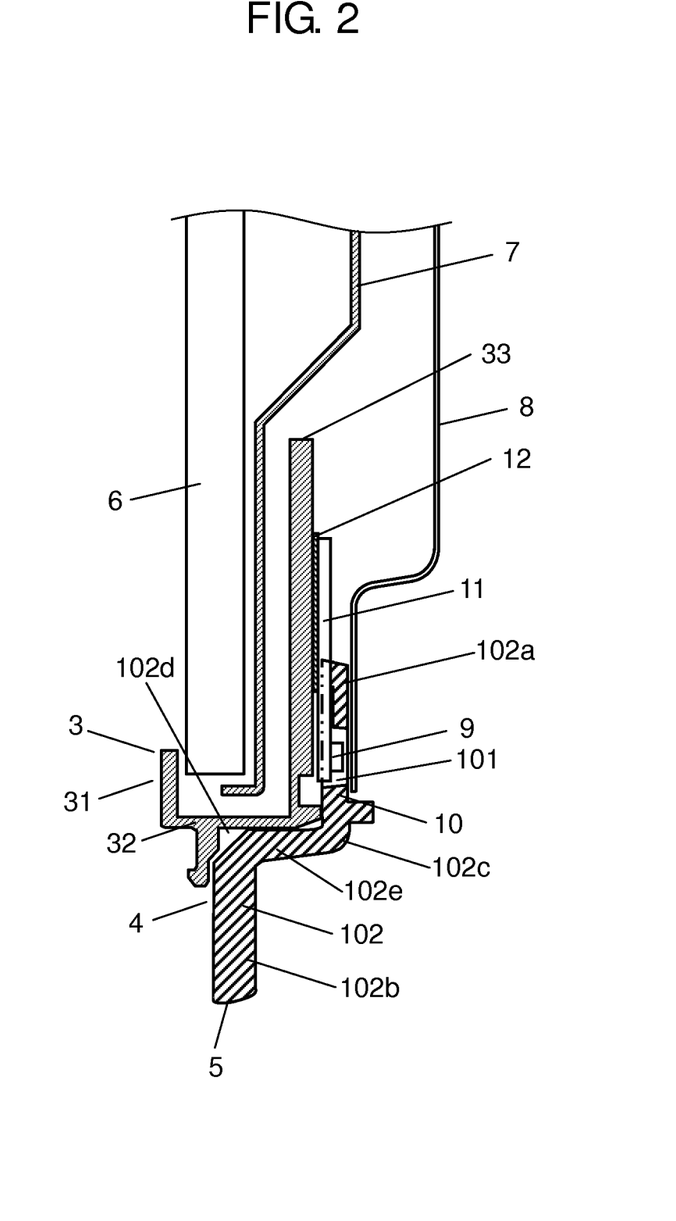
FIG. 2 is a cross-sectional view showing a structure of a light-emission part in the display device.
Figure 3:
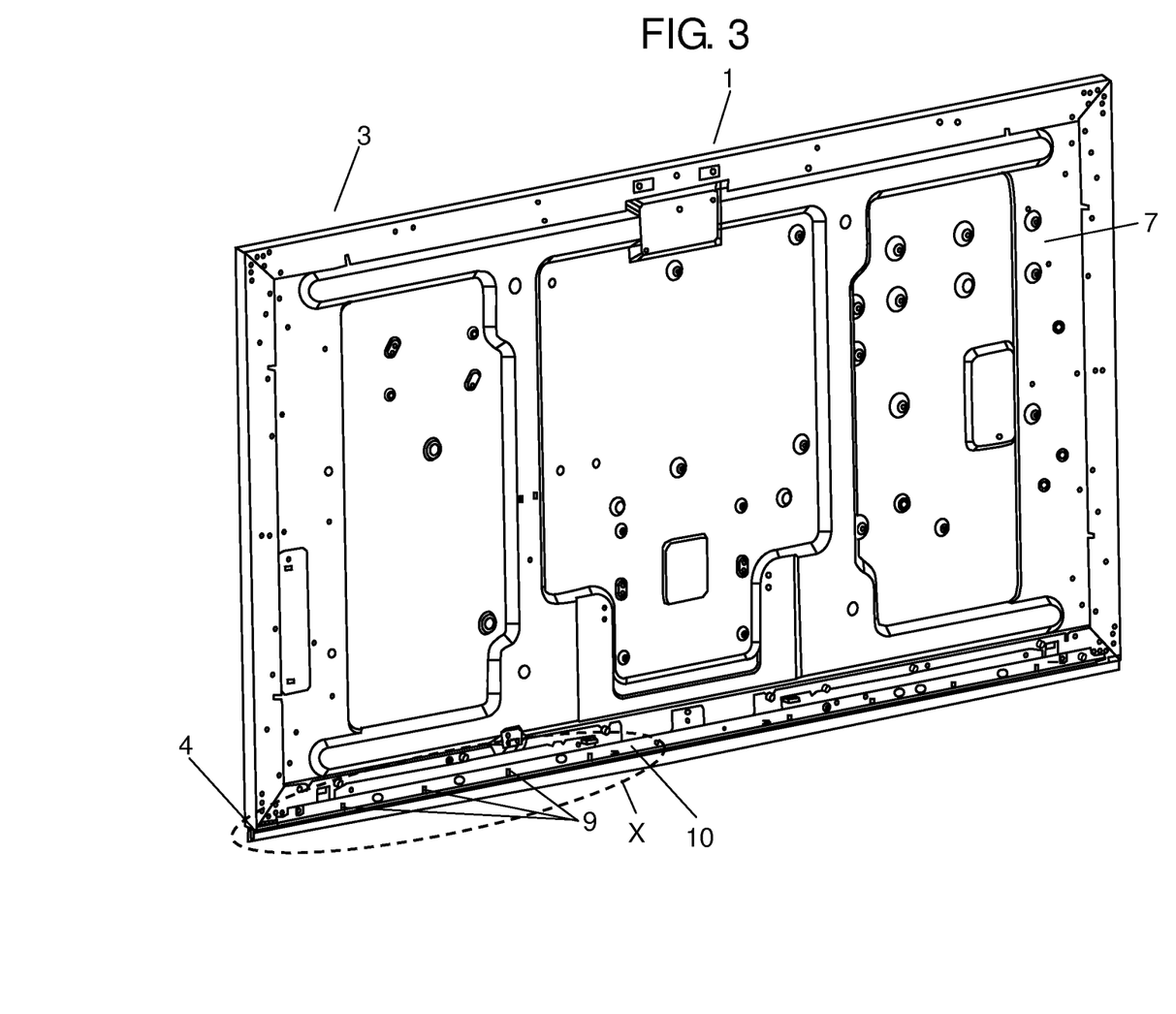
FIG. 3 is a perspective view showing an internal arrangement structure in the display device after a back cabinet has been removed.
Figure 4:
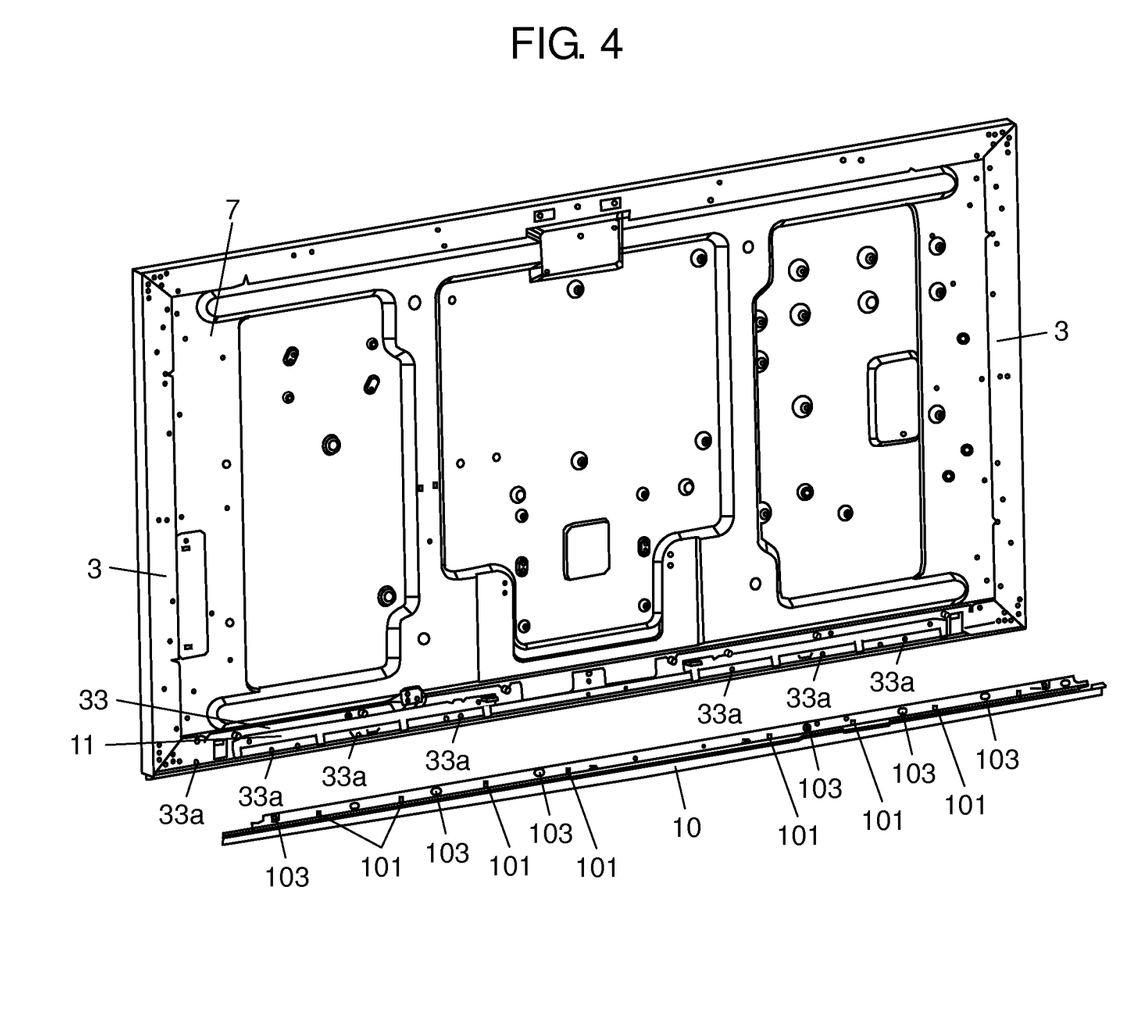
FIG. 4 is an exploded perspective view after a light-guide part of the light-emission part has been removed compared with FIG. 3.
Figure 5:
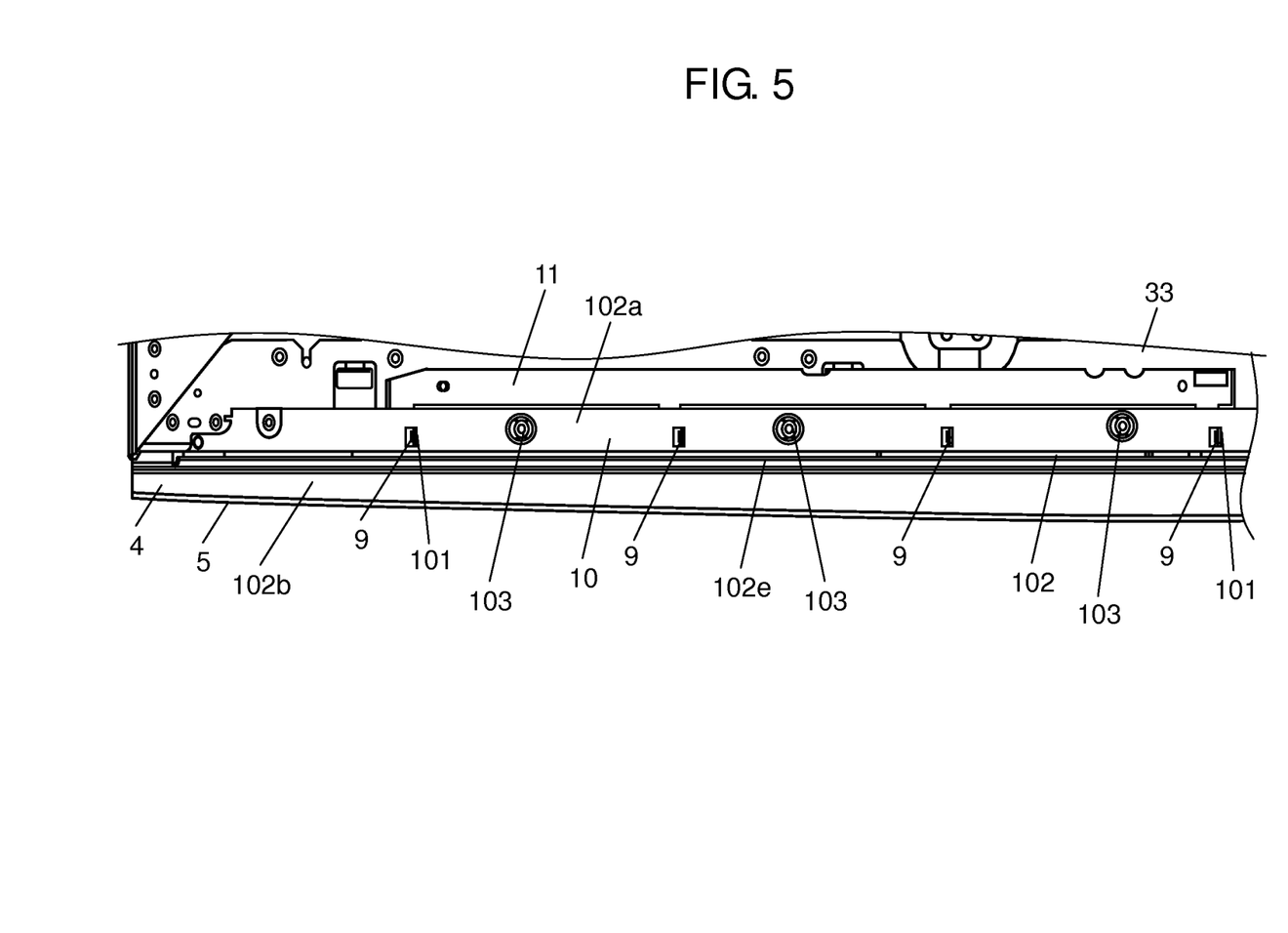
FIG. 5 is an enlarge view of part X in FIG. 3.
Figure 6:
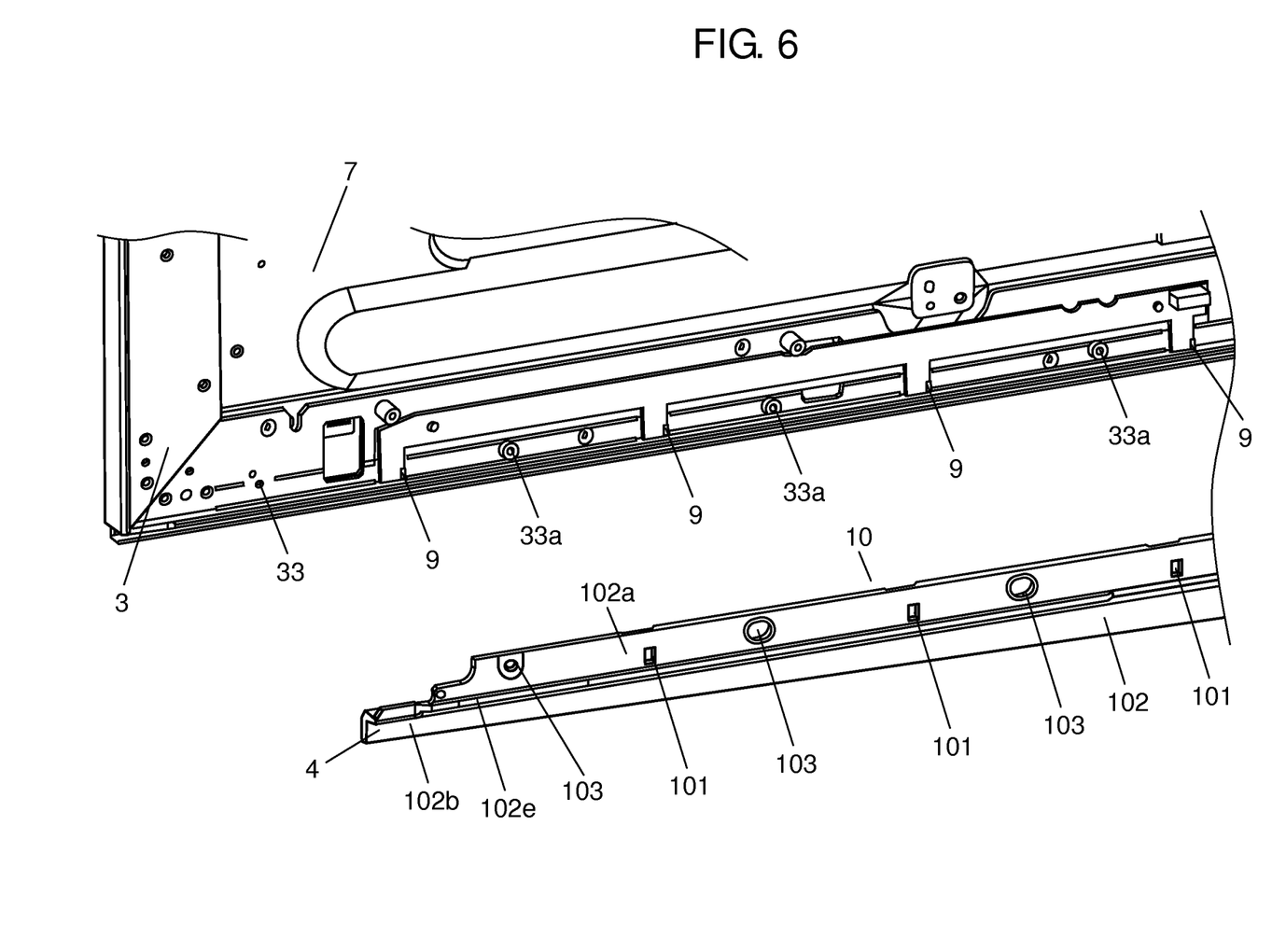
FIG. 6 is an exploded perspective view after a light-guide part of the light-emission part has been removed compared with FIG. 5.

FIG. 2 is a cross-sectional view showing a structure of the light-emission part in the display device. FIG. 3 is a perspective view showing an internal arrangement structure in the display device after the back cabinet has been removed. FIG. 4 is an exploded perspective view after a light-guide part of the light-emission part has been removed compared with FIG. 3. FIG. 5 is an enlarged view of part X in FIG. 3. FIG. 6 is an exploded perspective view after the light-guide part of the light-emission part has been removed compared with FIG. 5.

As shown in FIG. 2, display panel 6 including a liquid crystal panel and a back light unit is disposed in case 1, and the back surface side of display panel 6 is covered with metal back surface member 7. Back cabinet 8 composing case 1 with frame member 3 is disposed so as to cover the back surface side of display panel 6 over back surface member 7. In addition, frame member 3 has first frame part 31 for covering the peripheral part of the front surface side of display panel 6, second frame part 32 for covering a side surface of display panel 6, and third frame part 33 for covering a peripheral part of the back surface side of display panel 6.

Light-emission part 4 includes a plurality of light emitting diodes (hereinafter, referred to as LEDs) 9, each which serves as a light source for emitting light such as white, red, or blue light, and light-guide part 10 for guiding the light from LEDs 9 and outputting the light from light outputting part 5. Light-guide part 10 is configured in such a manner that light transmissive resin material such as acryl or polycarbonate is molded into a longitudinal plate shape. In addition, LEDs 9 are mounted on circuit substrate 11, and circuit substrate 11 is mounted on a back surface of third frame part 33 of frame member 3 with insulating sheet 12 made of resin such as polycarbonate resin interposed between them. In addition, LEDs 9 are disposed by combining a white LED, a red LED, and a blue LED, so that by changing the LED, different color light can be emitted from the light source.

As shown in FIGS. 2 to 6, light-guide part 10 has a plurality of light inputting parts 101 each having LED 9, for receiving the light from LEDs 9, light guiding part 102 for totally reflecting the light from light inputting parts 101 and guiding the light in an arrangement direction of LEDs 9, and light outputting part 5 for outputting the light guided by light guiding part 102.

In addition, light guiding part 102 of light-guide part 10 has first light guiding part 102a which forms light inputting parts 101 having LEDs 9, and guides the light from light inputting parts 101 in the arrangement direction of LEDs 9, second light guiding part 102b which is integrally formed with first light guiding part 102a and guides the light guided by first light guiding part 102a to light outputting part 5, reflecting parts 102c and 102d which are provided between first light guiding part 102a and second light guiding part 102b, and guide the light from first light guiding part 102a to second light guiding part 102b, and third light guiding part 102e which is provided between reflecting part 102c and reflecting part 102d.

Light-guide part 10 is disposed between frame member 3 and back cabinet 8 in such a manner that first light guiding part 102a is screwed to third frame part 33 of frame member 3 while second light guiding part 102b having light outputting part 5 is exposed from frame member 3. A plurality of holes 103 through which fixation screws penetrate are provided between light inputting parts 101, in first light guiding part 102a of light-guide part 10. In addition, screw holes 33a through which the screws penetrate are provided in third frame part 33 of frame member 3. Furthermore, the screw for fixing light-guide part 10 to frame member 3 partially serves as a screw for fixing back cabinet 8 to frame member 3, and back cabinet 8 is fixed to frame member 3 by the screws fastened from an outer side of back cabinet 8, so that light-guide part 10 can be also fixed to frame member 3 tightly.

Figure 7:
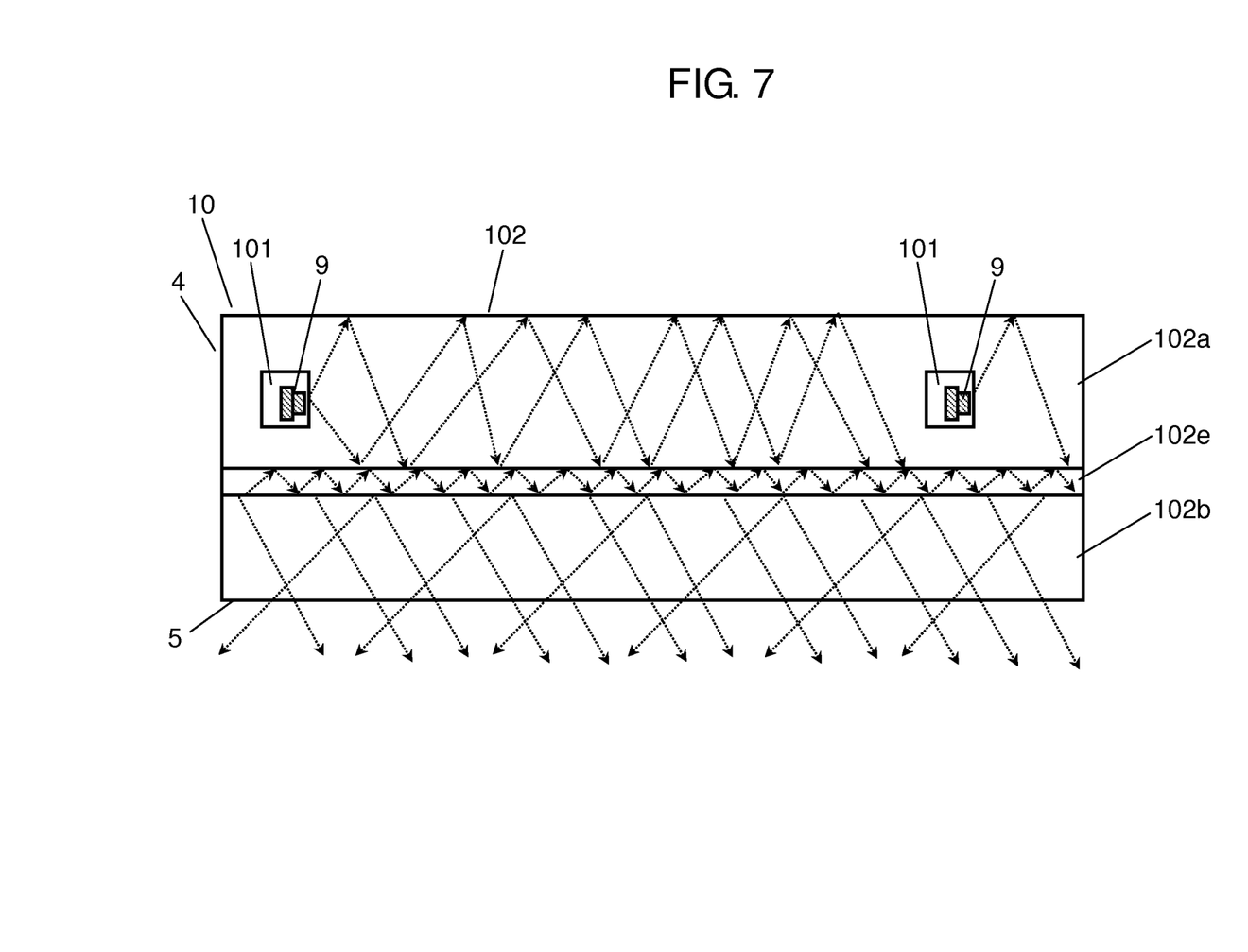
FIG. 7 is an explanatory view in which an LED and the light-guide part are partially enlarged in the light-emission part.
Figure 8:
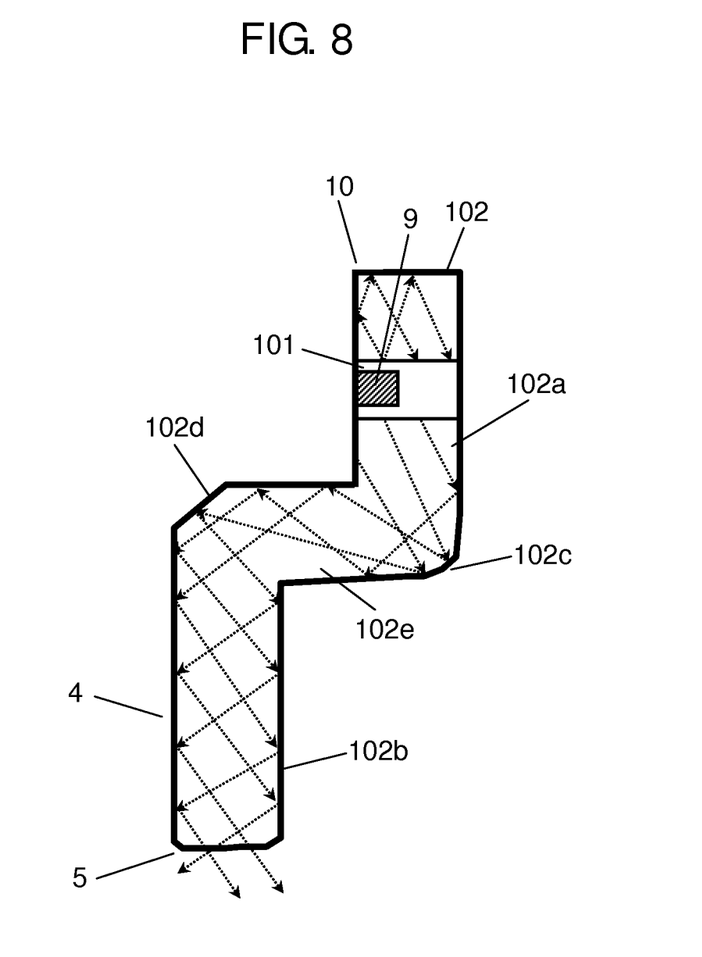
FIG. 8 is an explanatory view in which the LED and the light-guide part are partially enlarged in the light-emission part.

FIGS. 7 and 8 are explanatory views in which the LEDs and the light-guide part are partially enlarged in the light-emission part. FIG. 7 is a view taken along the arrangement direction of the LEDs, and FIG. 8 is a view showing a cross-sectional surface cut at an LED part. In FIGS. 7 and 8, dotted lines and arrows show behavior of the light passing through light-guide part 10.

As shown in FIGS. 7 and 8, the light emitted from LED 9 is transferred from light inputting part 101 provided in first light guiding part 102a of light-guide part 10 to first light guiding part 102a, totally reflected on an inner surface of first light guiding part 102a, and guided to second light guiding part 102b through reflecting parts 102c and 102d, and third light guiding part 102e. In addition, a surface for efficiently reflecting the light from LED 9 in a lower direction is provided on an upper end surface of first light guiding part 102a, and in addition, the light from LED 9 is reflected or scattered on an inner surface of hole 103. Thus, the light is also guided in the lower direction.

The light guided to second light guiding part 102b is totally reflected on an inner surface of second light guiding part 102b, and spread throughout second light guiding part 102b. In addition, the light guided to second light guiding part 102b is outputted from light outputting part 5 while being spread throughout second light guiding part 102b, and as a result, light-emission part 4 linearly and uniformly emits the light according to a shape of light outputting part 5. In addition, light outputting part 5 is formed in such a manner that an embossing process is performed on a tip end part of light guiding part 102 so that the light can be efficiently outputted.

Reflecting part 102c has a reflecting surface curved into an arc shape, so that the light from first light guiding part 102a can be efficiently reflected and guided to third light guiding part 102e. In addition, reflecting part 102d provided closer to frame member 3 has a linear reflecting surface which is inclined at an angle of roughly 45 degrees. As a result, frame member 3 and light-guide part 10 can be disposed closely to each other, so that a dimension can be small as a whole.

Figure 9:
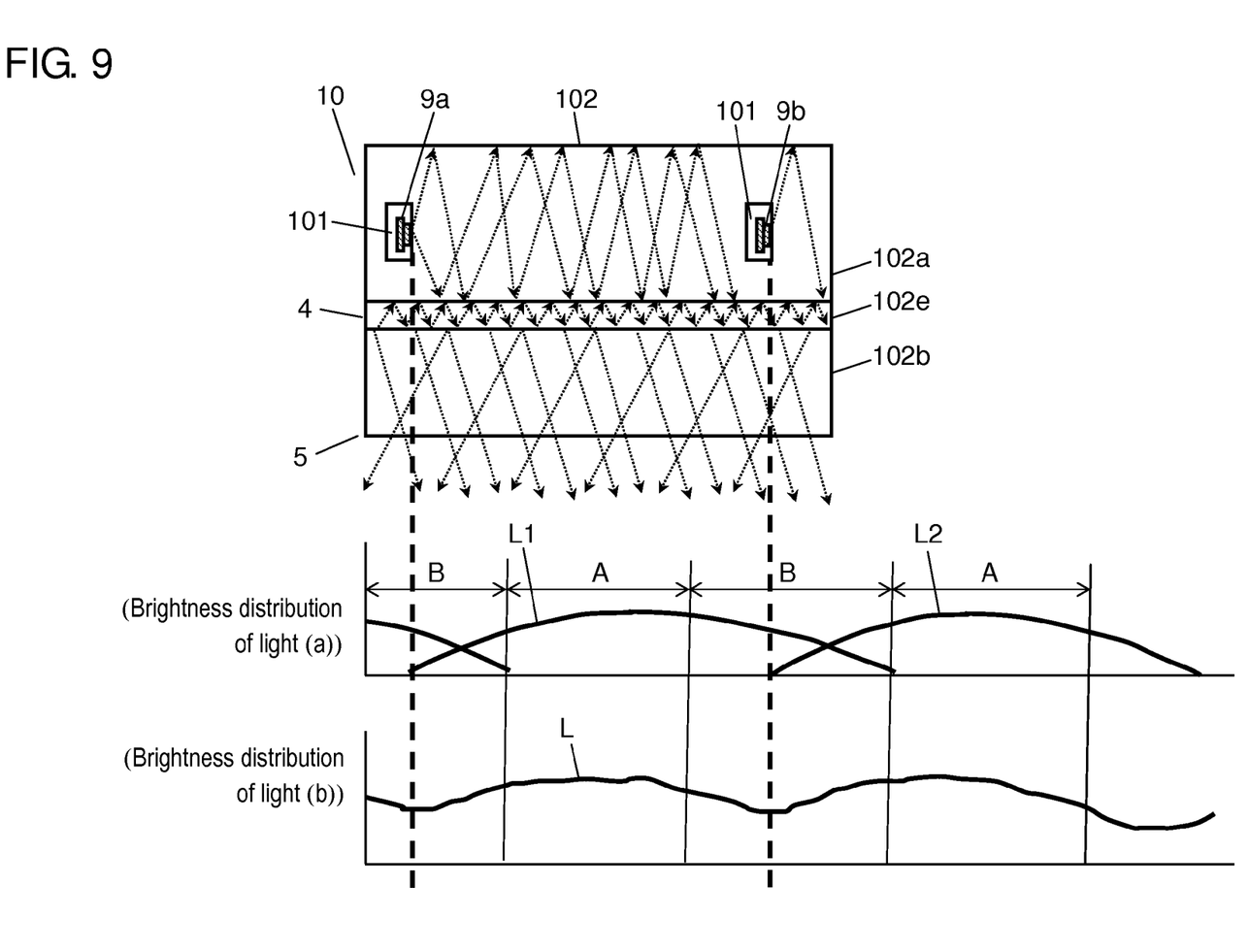
FIG. 9 is an explanatory view for explaining a relationship between a position of the LED of the light-emission part and a brightness distribution of light from the light outputting part.

FIG. 9 is an explanatory view for explaining a relationship between a position of the LED in the light-emission part and a brightness distribution of the light from the light outputting part. Referring to FIG. 9, brightness distribution (a) of light shows a brightness distribution of light emitted from one specific LED and outputted from the light outputting part of the light-guide part, and brightness distribution (b) of light shows a brightness distribution of synthetic light emitted from the specific LED and its adjacent LED and outputted from the light-outputting part.

According to brightness distribution (a) of the light in FIG. 9, as shown by brightness distribution lines L1 and L2, the brightness distribution of the light emitted from specific LED 9a, guided in light-guide part 10, and outputted from light outputting part 5 has characteristics of having a mountain-shaped distribution which increases from the position of specific LED 9a, reaches a maximum value, and decreases from the maximum value with distance from specific LED 9a. That is, each of brightness distribution lines L1 and L2 has characteristics of having distribution valley B on each side of distribution peak A which shows the maximum value of the brightness.

In addition, as for LED 9b adjacent to specific LED 9a of LEDs 9, in order to minimize a difference between a maximum value and a minimum value of brightness distribution line L, in brightness distribution (b) in FIG. 9, it is disposed at a position corresponding to distribution valley B which is provided below the maximum value of the brightness distribution.

Thus, according to brightness distribution (b) of the light in FIG. 9, as shown by brightness distribution line L, light-emission part 4 uniformly emits the light from whole light outputting part 5, so that the display device can be high in commercial value in view of design.

Figure 10:
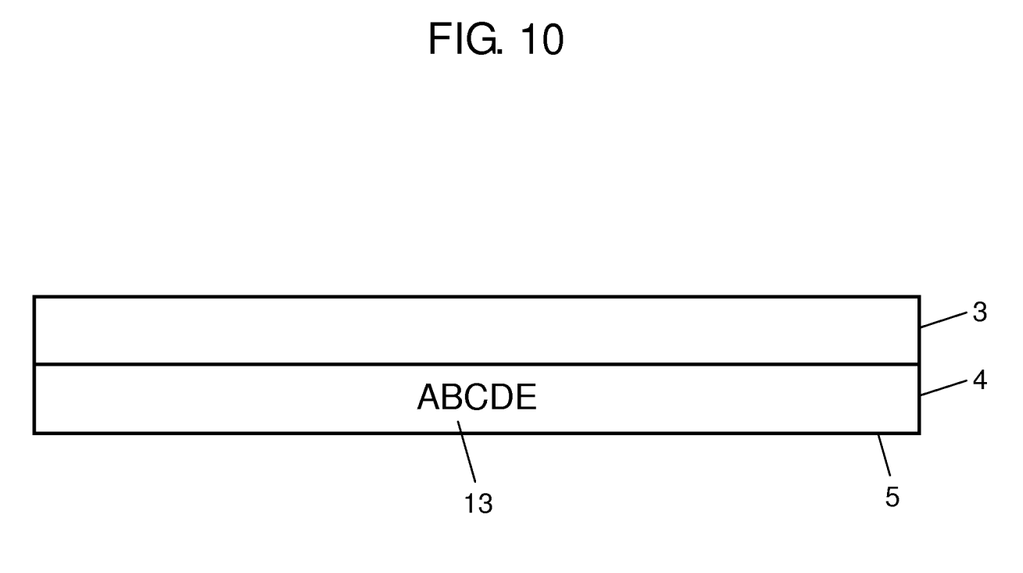
FIG. 10 is a plan view in which part M in FIG. 1 is enlarged.

In addition, FIG. 10 is a plan view in which part M in FIG. 1 is enlarged. According to an example shown in FIG. 10, display mark 13 such as characters is formed at a part which can be seen from a front surface of light-emission part 4. Display mark 13 is provided in such a manner that characters are formed on a surface of a back surface side of second light guiding part 102b of light-guide part 10, in white ink or other colored ink, by printing.

When display mark 13 is formed in this way, the light reflected in second light guiding part 102b is partially reflected by display mark 13, so that when second light guiding part 102b is viewed from the front surface side, display mark 13 looks shining. More specifically, light guiding part 102 is made of light transmissive material, and its background can be seen through, so that when LED 9 emits the light, light outputting part 5 at the tip end of second light guiding part 102b and display mark 13 look shining.

As described above, light-emission part 4 includes LEDs 9, and light-guide part 10 which guides the light from LEDs 9 and outputs the light from light outputting part 5. In addition, light-guide part 10 has light imputing parts 101 having LEDs 9, for receiving the light from LEDs 9, light guiding part 102 for totally reflecting the light from light inputting parts 101 and guiding it in the arrangement direction of LEDs 9, and light outputting part 5 for outputting the light guided by light guiding part 102. In addition, LED 9 is disposed in the position corresponding to the distribution valley, in the brightness distribution of the light outputted from light outputting part 5 of light-guide part 10.

As a result, it is possible to provide the display device in which the light can be emitted from the surface of case 1 with the small number of LEDs 9, and a commercial value in view of design is improved without causing a considerable increase in cost.

Furthermore, according to the light-guide part 10, second light guiding part 102b is exposed at the surface of case 1, and display mark 13 is formed on the surface of the front surface side of second light guiding part 102b and displayed by the light guided in second light guiding part 102b, so that display mark 13 such as the characters can be shined, and the value in view of design can be enhanced.

In addition, light-guide part 10 has holes 103 for mounting itself on the display device, so that light-guide part 10 can be mounted on the display device only with the screws. Furthermore, light-guide part 10 has first light guiding part 102a for guiding the light from LEDs 9, second light guiding part 102b, and third light guiding part 102e, so that the light from LEDs 9 can be outputted from light outputting part 5 provided at the tip end part of second light guiding part 102b, under the condition that a light intensity distribution is sufficiently equalized. In addition, holes 103 for the screws to mount light-guide part 10 are provided in first light guiding part 102a, so that even when the light is scattered in holes 103, the light intensity distribution is sufficiently equalized in light outputting part 5 provided at the tip end part of second light guiding part 102b.

In addition, according to the above exemplary embodiment, the description has been given of the case where one LED 9 is disposed in light inputting part 101 of light-guide part 10, and the light from LED 9 is outputted in the same direction, but as another configuration, two or more LEDs 9 may be disposed in light inputting part 101 of light-guide part 10, and the light may be outputted from LED 9 in a different direction.

Furthermore, according to the above exemplary embodiment, LEDs 9 are disposed such that the light can be outputted toward adjacent LED 9, that is, in the horizontal direction, but they may be disposed in light inputting parts 101 such that the light is outputted toward an inner side opposite to light outputting part 5. In this case, the light directly outputted from LEDs 9 is not likely to be seen from light outputting part 5, so that a bright spot can be prevented from being generated because the light of LEDs 9 is not directly seen at light outputting part 5.

Figure 11:
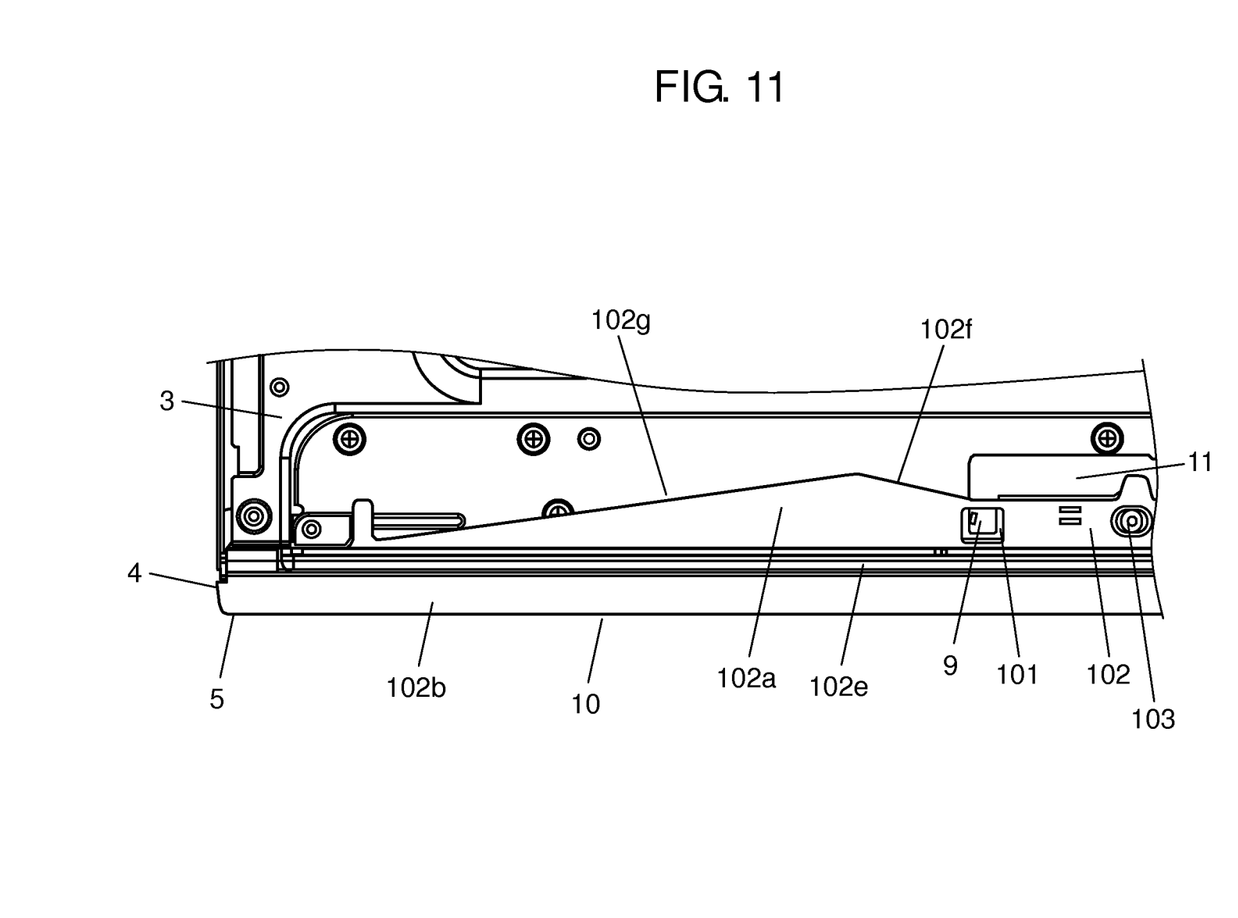
FIG. 11 is a plan view showing another exemplary embodiment of a light-guide part, in the present technique.
Figure 12:
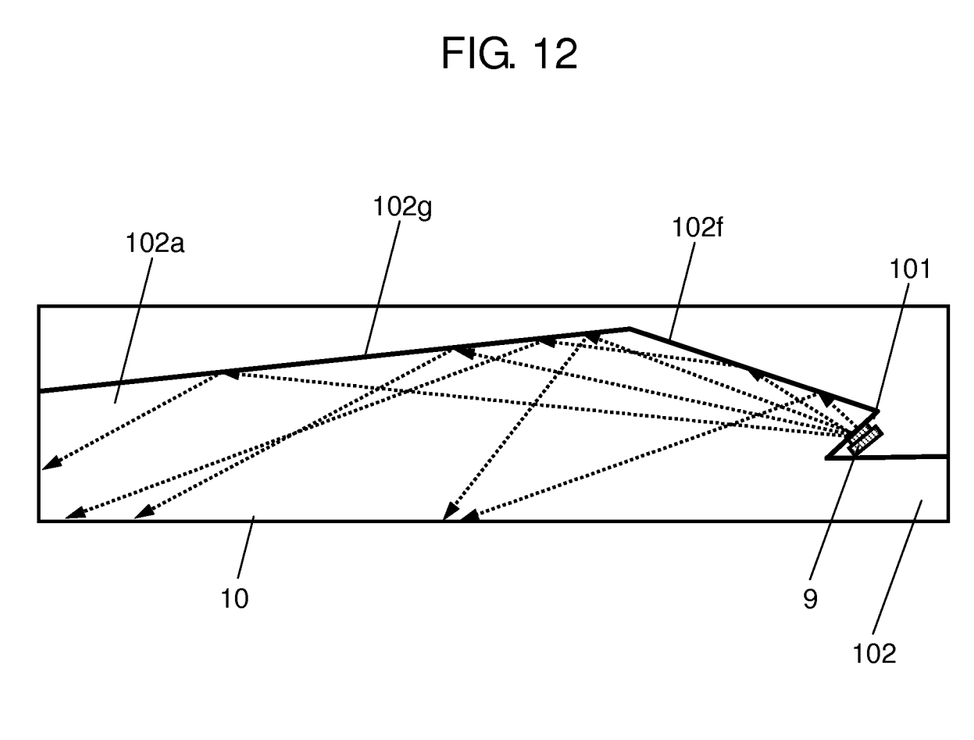
FIG. 12 is an explanatory view in which the light-guide part and a light source are partially enlarged compared with the example in FIG. 11.

FIG. 11 is a plan view showing another exemplary embodiment of light-guide part 10, in the present technique. FIG. 12 is an explanatory view in which the light-guide part and a light source are partially enlarged compared with an example shown in FIG. 11.

As shown in FIGS. 11 and 12, first light guiding part 102a of light-guide part 10 has first reflecting surface 102f and second reflecting surface 102g which reflect the light outputted from LEDs 9. Second reflecting surface 102g is formed so as to be longer than first reflecting surface 102f, and makes an obtuse angle of 100° or more with first reflecting surface 102f.

In addition, LED 9 is disposed in light inputting part 101 so that it outputs the light in a direction toward first reflecting surface 102f and second reflecting surface 102g, that is, toward an inner side.

Therefore, as shown by arrows in FIG. 12, the light outputted from LED 9 has a light path guided to first reflecting surface 102f, reflected by first reflecting surface 102f, and guided to third light guiding part 102e, a light path guided to second reflecting surface 102g, reflected by second reflecting surface 102g, and guided to third light guiding part 102e, and a light path guided to first reflecting surface 102f, reflected by first reflecting surface 102f, guided to second reflecting surface 102g, reflected by second reflecting surface 102g, and guided to third light guiding part 102e. As a result, long light lines can be formed from one LED 9. In addition, the light directly emitted from LED 9 is not likely to be seen from light outputting part 5, so that a bright spot can be prevented from being generated because the light from LED 9 is not directly seen at light outputting part 5.

In addition, LED 9 has functions as follows, for example.

(1) It flicks with a period of several seconds while the display device does not receive a broadcasting signal.

(2) It lights up at a predetermined time.

(3) It lights up when information of a guest is inputted from an intercom.

(4) It shines when it is time for programmed recording.

Thus, various information alarm functions can be attained.

Although the exemplary embodiments of the present technique have been described in the above, the present technique is not limited to the above exemplary embodiments, and various variations can be made within a technical scope described in claims.

What is claimed is:

1. A display device comprising:
    a display part for displaying an image;
    a case for housing the display part; and
    a light-emission part having a light outputting part exposed at a surface of the case, wherein:
    the light-emission part includes a plurality of light sources, and a light-guide part for guiding light emitted from each of the plurality of light sources and outputting the light from the light outputting part,
    the light-guide part includes a plurality of light inputting parts having the plurality of light sources, respectively, for receiving the light from the plurality of light sources, a light guiding part for reflecting and guiding the light from each of the plurality of light inputting parts in an arrangement direction of the plurality of light sources, and the light outputting part for outputting the light guided by the light guiding part,
    a brightness distribution of light emitted from one specific light source of the plurality of light sources and outputted from the light outputting part of the light-guide part has a characteristic of having a mountain-shaped distribution increasing from a position of the specific light source, then reaching a maximum value, and then decreasing with distance from the specific light source, and
    a light source adjacent to the specific light source is disposed at a position where the brightness distribution decreases from the maximum value of the brightness distribution.

2. The display device according to claim 1, wherein
    the case has a frame-shaped frame member disposed around a peripheral part of the display part, and a back cabinet disposed so as to cover a back surface side of the display part, and
    the light guiding part of the light-guide part is disposed between the frame member and the back cabinet while the light outputting part is exposed from the frame member.

3. The display device according to claim 1, wherein
    the light guiding part of the light-guide part includes:
    a first light guiding part including the plurality of light inputting parts having the plurality of light sources, for totally reflecting the light from each of the plurality of light inputting parts and guiding the light in an arrangement direction of the plurality of light sources,
    a second light guiding part integrally formed with the first light guiding part, for guiding the light guided by the first light guiding part to the light outputting part formed at a tip end part thereof, and
    a reflecting part provided between the first light guiding part and the second light guiding part, for guiding the light from the first light guiding part to the second light guiding part.

4. The display device according to claim 3, wherein
    the second light guiding part of the light-guide part is exposed at the surface of the case, and a display mark is formed in the second light guiding part and displayed by the light guided in the second light guiding part.

5. The display device according to claim 1, wherein
    each of the plurality of light sources is disposed in each of the plurality of light inputting parts so as to emit light toward an inner side opposite to the light outputting part.

6. A display device comprising:
    a display part for displaying an image;
    a case for housing the display part; and
    a light-emission part including a light-guide part, a plurality of light sources and a light outputting part, and configured to guide light emitted from each of the plurality of light sources and output the light from the light outputting part, wherein:
    the plurality of light sources are embedded in the light-guide part,
    the light-guide part is configured such that a light from each of the plurality of light inputting part is reflected and guided in an arrangement direction of the plurality of light sources,
    a brightness distribution of light emitted from one specific light source of the plurality of light sources and outputted into the light-guide part has a characteristic of having a mountain-shaped distribution increasing from a position of the specific light source, then reaching a maximum value, and then decreasing with increasing a distance from the specific light source,
    a light source adjacent to the specific light source is disposed at a position where the brightness distribution decreases from the maximum value of the brightness distribution, and
    a light output axis of the specific light source faces a direction other than a direction toward the light outputting part.

* * * * *